United States Patent
Brown et al.

[11] Patent Number: 5,881,699
[45] Date of Patent: Mar. 16, 1999

[54] DIESEL FUEL RECIRCULATING MANIFOLD

[75] Inventors: Bradley Allen Brown, Leonard; Allen F. Bolton, Dearborn Heights; Andrew Sasyk, Canton, all of Mich.

[73] Assignee: Ford Global Technologies, Inc., Dearborn, Mich.

[21] Appl. No.: 996,168

[22] Filed: Dec. 22, 1997

[51] Int. Cl.⁶ .................................................. F02M 37/04
[52] U.S. Cl. ........................................ 123/514; 123/557
[58] Field of Search ................................. 123/514, 509, 123/510, 557, 516

[56] References Cited

U.S. PATENT DOCUMENTS 4,231,341 11/1980 Johnston .
4,481,931 11/1984 Bruner ..................................... 123/557
4,502,450 3/1985 Duprez .................................... 123/557
4,502,451 3/1985 Duprez .................................... 123/557
4,574,762 3/1986 Muller et al. .
4,617,116 10/1986 Seiler ...................................... 123/514
5,085,198 2/1992 Bartlett ................................... 123/557
5,092,304 3/1992 McNelley ............................... 123/557
5,195,494 3/1993 Tuckey ................................... 123/514
5,269,276 12/1993 Brown .
5,623,907 4/1997 Cotton .................................... 123/514

*Primary Examiner*—Carl S. Miller
*Attorney, Agent, or Firm*—Neil P. Ferraro

[57] ABSTRACT

A diesel fuel recirculating manifold for a fuel delivery system selectively provides warm return fuel to unclog (de-wax or de-ice) the components of the fuel system, such as the fuel filter, after a cold start. Once clogging is no longer an issue, the warm fuel is directed to the fuel tank.

15 Claims, 6 Drawing Sheets

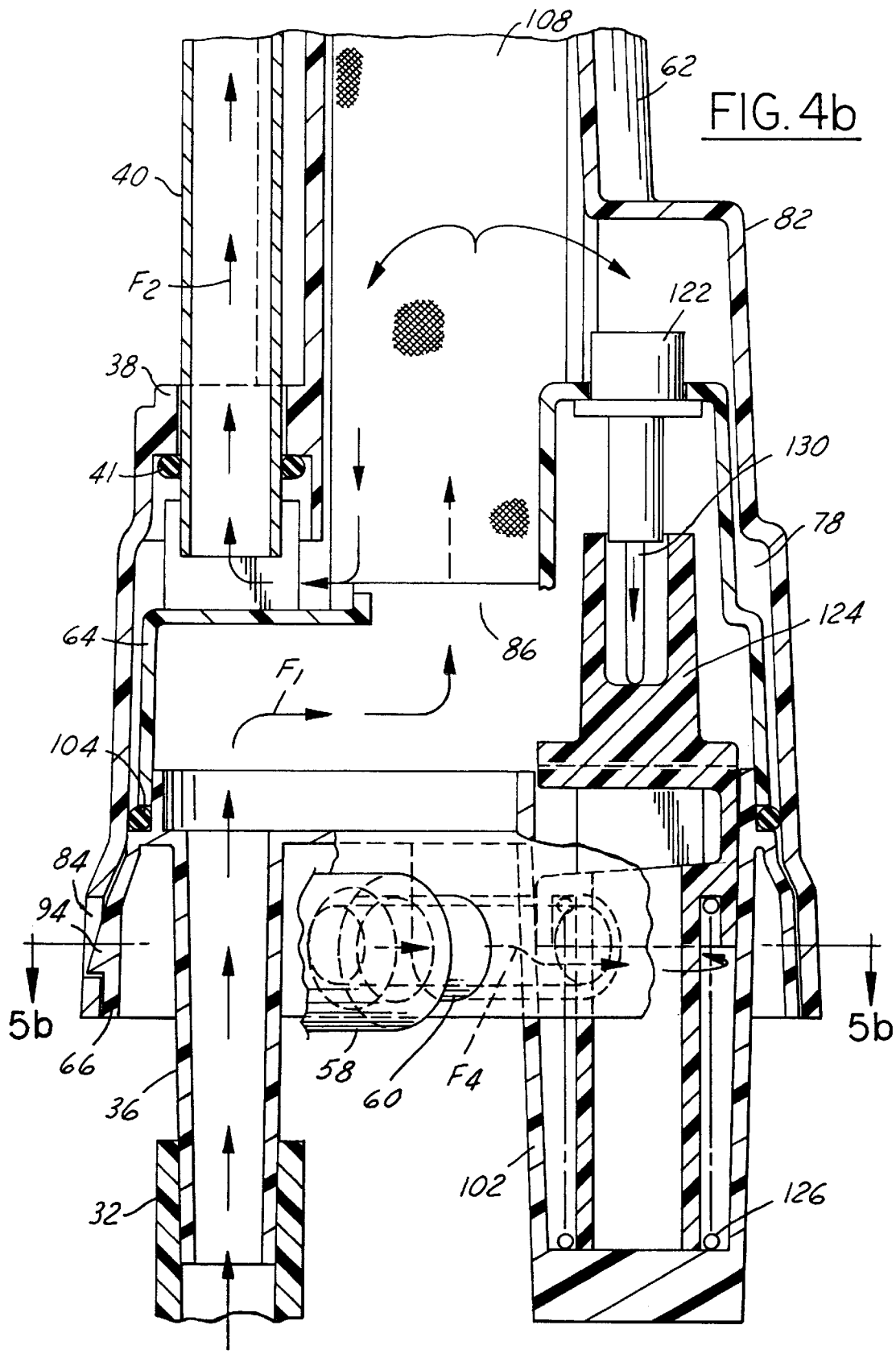

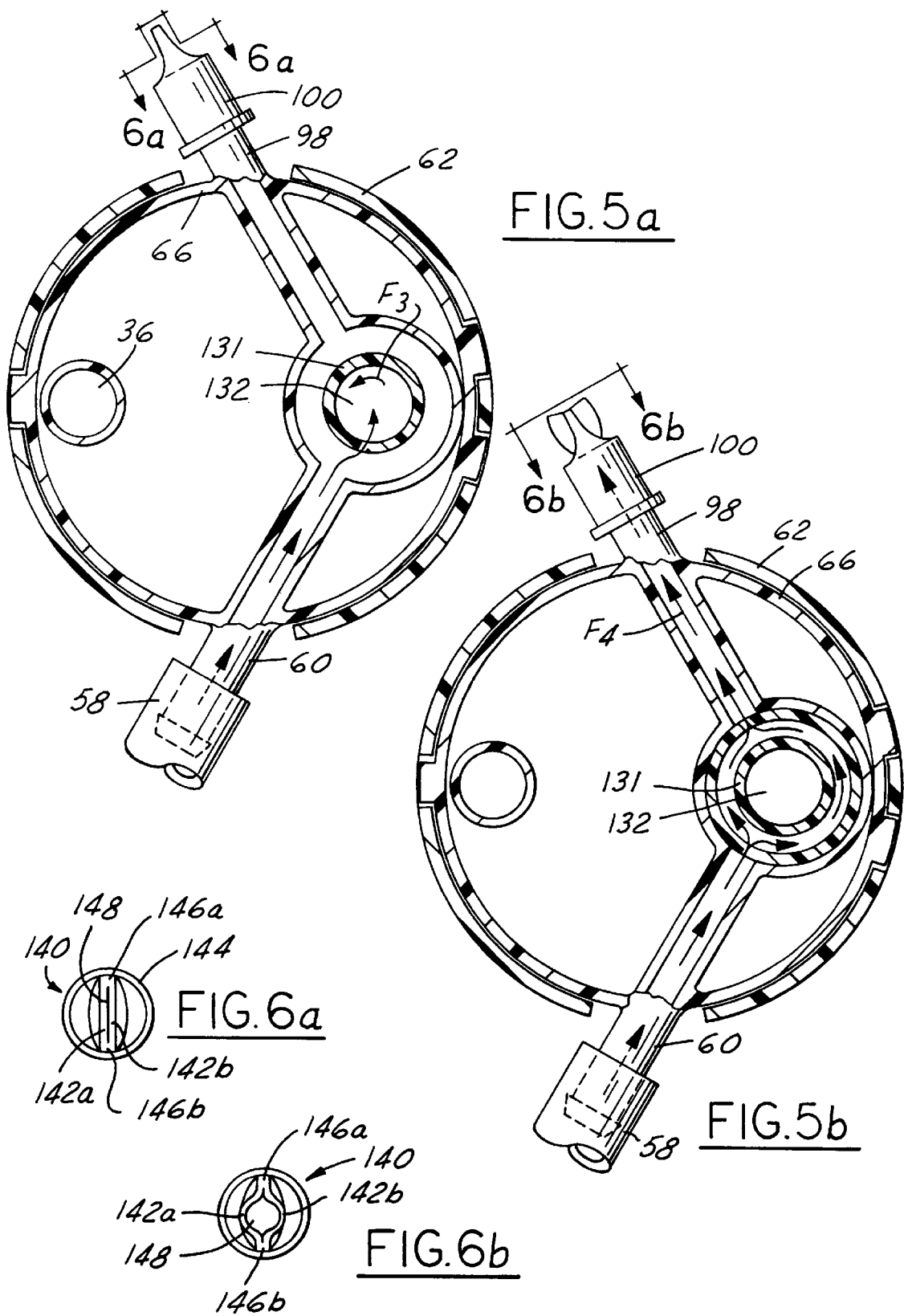

DIESEL FUEL RECIRCULATING MANIFOLD

FIELD OF THE INVENTION

The present invention relates to temperature control in fuel delivery systems for an internal combustion engine, and, more particularly to temperature controlled recirculating manifolds for diesel fuel delivery systems.

BACKGROUND OF THE INVENTION

It is well known that when diesel fuel is at low temperatures approaching the cloud point, paraffin wax crystals will form. Further, at these cold temperatures, any water in the fuel tank may form ice crystals. To prevent wax or ice choking of the fuel system components, such as a filter, after a cold start, electric heaters are used in some prior art fuel delivery systems. Because newer diesel injection systems also have higher fuel supply and return flow for system cooling, the size of the electric heater becomes too large to have an adequate de-waxing or de-icing effect on the increased supply fuel flow. Therefore, it may be desirable to divert warm fuel from the injection system to the unfiltered side of the filter to de-wax or de-ice the filter after a cold start to unclog the filter and other fuel system components.

The inventors of the present invention have found that prior art temperature controlled recirculating systems, which are used to selectively divert warm fuel to the fuel filter to de-wax or de-ice the fuel filter during a cold start, generally do not adequately provide for de-waxing or de-icing close to the fuel inlet because these devices are located outside the fuel tank. This is primarily due to the fact that these devices are relatively large and would otherwise encompass too much space within the fuel tank. In addition, some of these devices do not adequately unclog the fuel filter because the recirculating devices are located remotely from the filter.

SUMMARY OF THE INVENTION

An object of the present invention is to provide a novel in-tank diesel fuel recirculating manifold for recirculating warm diesel fuel from an engine through the fuel delivery system to reduce cold temperature clogging of the fuel delivery system. In one particular aspect of the invention, the manifold includes a housing, a fuel supply inlet disposed at one end of the housing and adapted to be positioned adjacent a bottom wall of a fuel tank, a fuel supply outlet disposed at another end of the housing, and a fuel return inlet and outlet formed on the housing. A fuel filter is disposed within the housing between the fuel supply inlet and the fuel supply outlet. The manifold also includes a temperature sensitive valve assembly disposed downstream of the fuel return inlet and upstream of the fuel return outlet and the fuel supply outlet for directing return fuel to either the fuel supply outlet or the fuel return outlet. Thus, at relatively cold operating temperatures, return fuel combines with supply fuel and is directed through the filter and out through the fuel return outlet. At relatively high fuel temperatures, return fuel is directed out through the fuel return outlet.

In a preferred embodiment, the manifold includes two longitudinally extending adjacently siamesed tubular filter housing portions for housing two longitudinally extending tubular filter elements.

An advantage of the present invention is that heated fuel is used to de-wax or de-ice the fuel filter, thereby obviating the need for electric or other external fuel heaters.

Another advantage of the present invention is that wax or ice build-up within the intake area of the fuel system is reduced.

Yet another advantage of the present invention is that a low cost, easily manufacturable fuel recirculating manifold is provided.

Still another advantage of the present invention is that a relatively large filtering capacity within a relatively small amount of space is provided.

Other objects, features and advantages of the present invention will be readily appreciated by the reader of this specification.

BRIEF DESCRIPTION OF THE DRAWINGS

The invention will now be described by way of example with reference to the accompanying drawings, in which:

FIGS. 4a and 4b are section views taken along line 4—4 of FIG. 2 showing alternate operating positions of the recirculating manifold, respectively, according to the present invention;

FIGS. 5a and 5b are section views taken along line 5a—5a and line 5b—5b of FIGS. 4a and 4b, respectively; and, FIGS. 6a and 6b are views taken along lines 6a and 6b of FIGS. 5a and 5b, respectively.

DETAILED DESCRIPTION OF THE PREFERRED EMBODIMENTS

Figure 1:
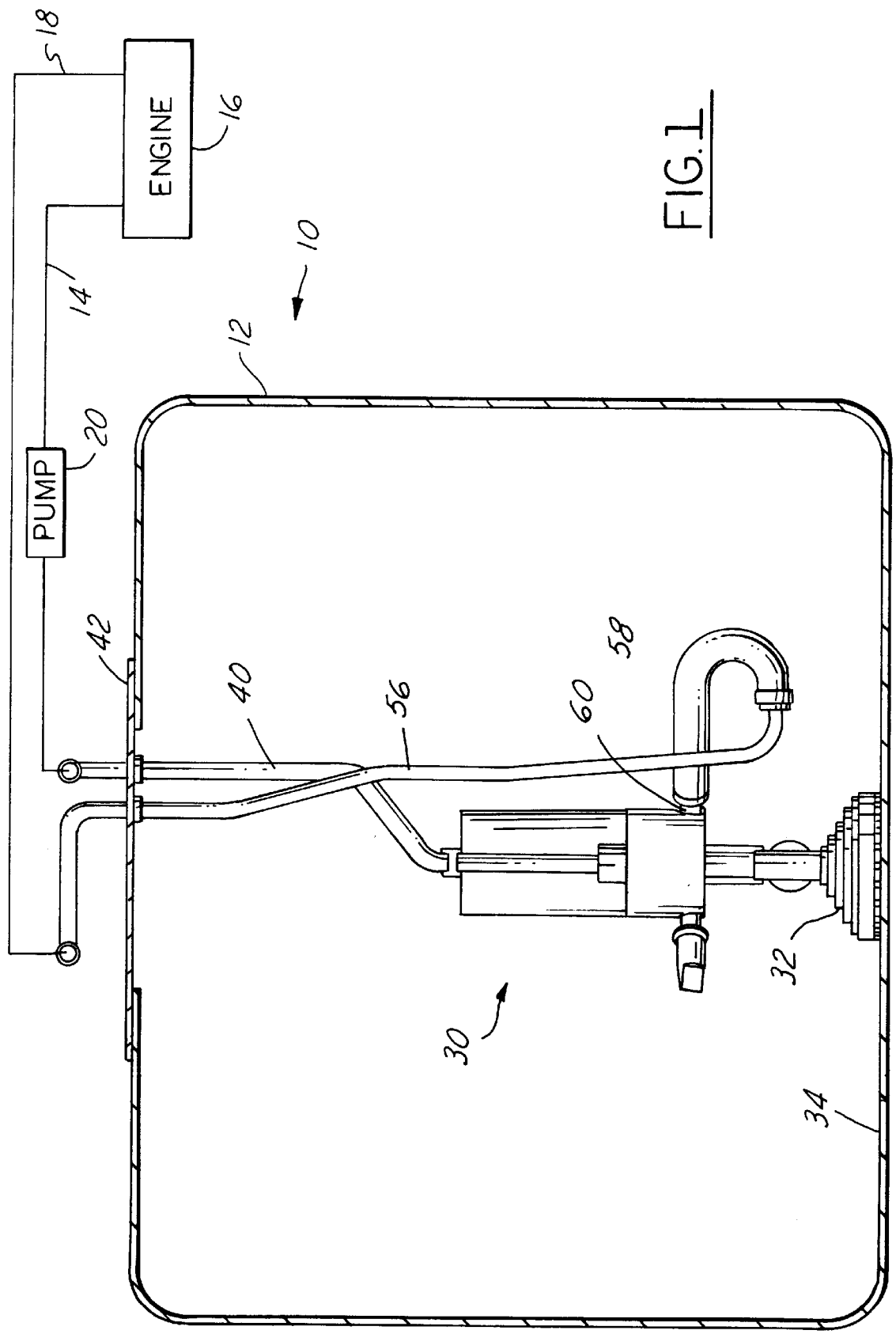
FIG. 1 is a schematic representation of a fuel system according to the present invention.

Diesel fuel delivery system 10, shown in FIG. 1, is a return type fuel system having fuel tank 12 coupled to engine 16 through supply line 14. Return line 18 allows fluid flow from engine 16 to fuel tank 12. Pump means 20 is used to draw fuel from tank 12 to engine 16. As used herein, pump means 20 may include a series of inter-connected components such as pressure regulating devices and corresponding valves and plumbing to provide the necessary fuel flow and fuel pressure for consumption by engine 16.

Figure 4A:
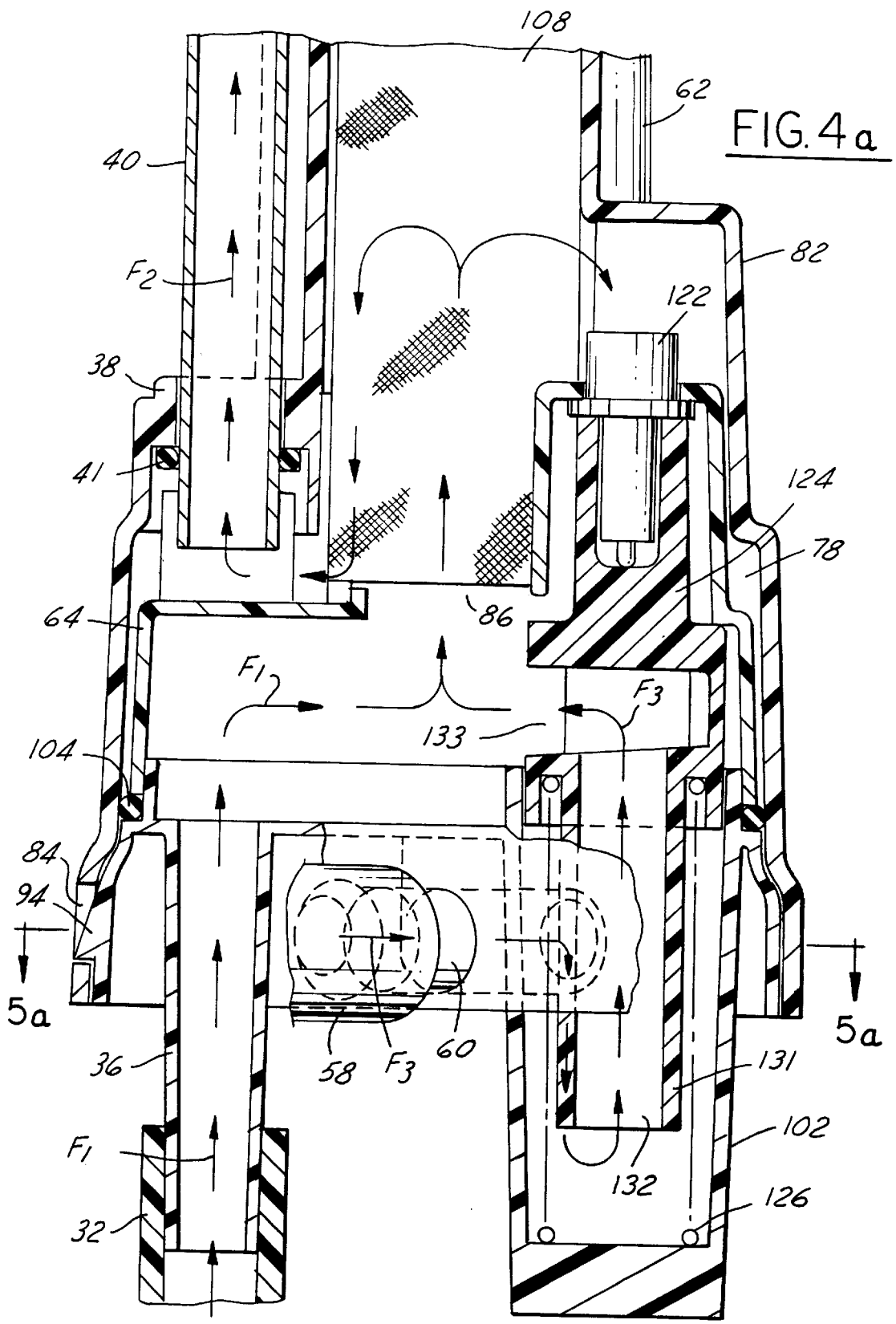

Fuel delivery system 10 also includes diesel fuel recirculating manifold 30 coupled to lift boot 32 at fuel supply inlet 36 for drawing fuel from bottom wall 34 of tank 12. Lift boot 32 includes baffles 35, screen 37 and a plurality of stand-offs 39 (see FIG. 2) to allow fuel to flow underneath lift boot 32 and through screen 37 to enter inlet 36. Manifold 30 further includes fuel supply outlet 38 coupled to fuel supply tube 40. Seal 41 is mounted in outlet 38. (See FIGS. 4a and 4b). Fuel supply 40 extends through the outer wall 42 mounted to fuel tank 12 to communicate with the remainder of fuel delivery system 10. When fuel recirculating manifold 30 is inserted into fuel tank 12, flange 42 is mounted to the top of fuel tank 12 and lift boot 32 collapses, due to baffles 37, to accommodate insertion thereof.

Figure 2:
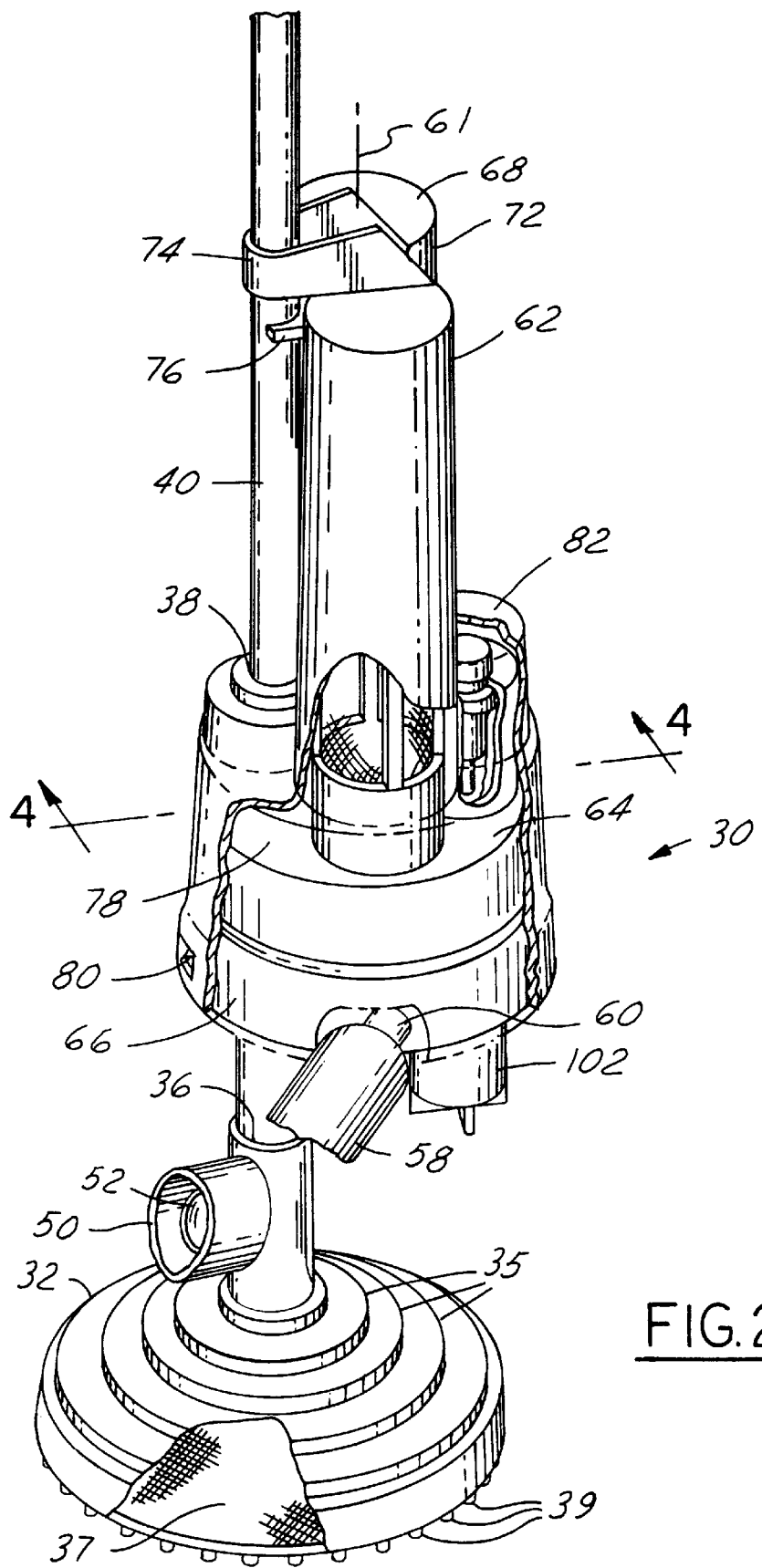
FIG. 2 is a perspective view of a recirculating manifold according to the present invention.

Continuing with reference to FIG. 2, lift boot 32 also includes bypass check valve 50 which includes diaphragm 52. Accordingly, should screen 37 become prematurely clogged, fuel may enter check valve 50 through diaphragm 52 to supply fuel through fuel recirculating manifold 30 by the action of pump means 20. Fuel then flows out outlet 38 to supply tube 40. Return fuel flows through return tube 56, which is coupled to hose 58, which, in turn, is coupled to fuel return inlet port 60 formed on manifold 30.

Figure 3:
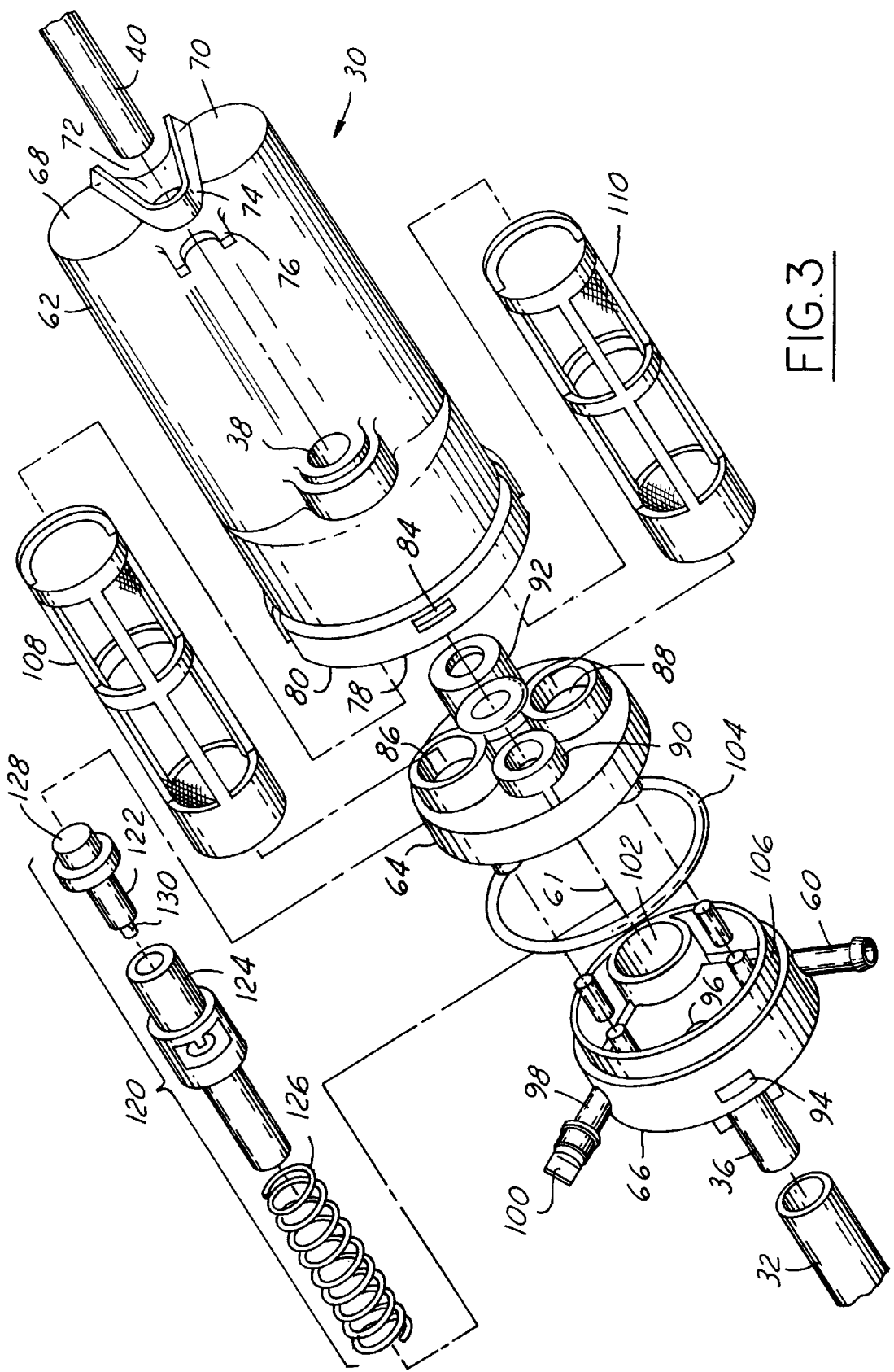
FIG. 3 is an exploded perspective view of the manifold according to the present invention.

Referring now to FIGS. 2 and 3, manifold 30 defines longitudinal axis 61 and includes first housing section 62, second housing section 64 and third housing section 66. First housing section 62 includes fuel supply outlet 38 and two longitudinally extending adjacently siamesed tubular filter housing portion 68, 70 formed at distal end 72 of housing 62. Housing section 62 further includes supply tube retaining portion 74, 76 for axially locating tube 40 relative to outlet 38. Tube 40 fits between the adjacently siamesed longitudinally extending housing portions 68, 70 which allows for reduced space within fuel tank 12. First housing section 62 further includes fuel chamber 78 disposed at proximal end 80 of housing section 62. Housing section 62 also includes upper longitudinally extending tubular valve assembly receiving portion 82, which is adjacently siamesed to tubular filter element housing portion 68, 70 and on an opposite side thereof from outlet 38. Further, a plurality of locking tab receiving holes 84 is formed at proximal end 68 of filter housing 62.

Second housing section 64 is disposed within fuel chamber 78 of housing section 62 and includes two filter inlets 86, 88 axially aligned with filter housing portion 68, 70 respectively, and passing through housing section 62. Housing section 64 also includes receiving portion 90 for receiving the end of tube 40. It should be noted that the receiving portion 90 does not allow tube 40 to pass through housing section 64. Passage 92, formed on housing section 62, is substantially axially aligned with longitudinally extending tubular valve assembly receiving portion 82 and passes through housing section 62. Longitudinally extending filter elements 108, 110 are disposed within tubular filter housing portion 68, 70 respectively and communicate with inlets 86 and 88, respectively.

Manifold 30 further includes third housing section 66 engaging housing section 62, with locking tabs 94 engaging receiving holes 84 of housing section 62. Fuel supply inlet 36 and return inlet 60 are formed on housing section 66. Inlet 36 extends through housing 66 as shown by opening 96. Fuel return outlet 98 is formed on housing section 66 on a opposite side from return inlet 60, and includes check valve 100, which will be described in further detail hereinafter. Lower longitudinally extending tubular valve assembly receiving portion 102 is formed in housing 66 and is axially aligned with upper longitudinally extending tubular valve assembly receiving portion 82 and passage 92. Seal 104 is placed in receiving groove 106 to sealing couple housing 66 to housing 62 with housing 64 therebetween.

Manifold 30 further includes temperature sensitive valve assembly 120 positioned within upper valve assembly receiving portion 82, passage 92 and lower valve assembly receiving portion 102. Valve assembly 120 is disposed downstream of fuel return inlet 60 and upstream of fuel supply outlet 98. Temperature sensitive valve assembly 120 includes temperature sensitive actuator 122 (typically referred to as a wax motor), spool valve 124 and return spring 126. Temperature sensitive actuator 122 includes body 128 and piston 130. Spool valve 124 includes axially extending sidewall 131 having port 132 extending therethrough and terminating at outlet 133. Actuator 122 is sensitive to fuel temperature within manifold 30, specifically chamber 78. At relatively high fuel temperature, piston 130 moves spool valve 124 as will be described herein after.

Referring now to FIGS. 4a, 4b, 5a and 5b, at engine start, fuel from fuel tank 12 enters pick up boot 32 and flows into inlet 36, shown as $F_1$. Initially, the fuel flows through the filter element 108, 110 through side walls thereof and out through outlet 38, shown as $F_2$. Warmed excess fuel (typically 15°–20° warmer than the fuel temperature in tank 12) from engine 16 is returned via return inlet 60, through port 132, (shown as $F_3$), combines with incoming fuel from inlet 36, flows through the unfiltered side of filter elements 108, 110 and out through outlet 38, shown as $F_2$. Thus, the warm fuel acts to de-wax or de-ice the filter so as to allow continued fuel flow to engine 16. As the temperature of the fuel increases beyond the set point of actuator 122, actuator 122, via piston 130, forces valve 124 against the action of return spring 126 to cause return fuel entering return port 60 to flow around sidewall 131 to return fuel outlet 98, shown as $F_4$.

Referring now to FIGS. 3, 6a and 6b, return fuel outlet 98 includes an elastomeric valve 140. Valve 140 includes a pair of legs 142a, 142b extending from tubular portion 144, fitted over outlet port 98. Legs 142a, 142b are joined at the peripheral edges 146a, 146b to form slit 148. Thus, as shown in FIG. 6b, as fuel flows through outlet 98, slit 148 opens to allow fuel to flow from tubular portion 144 out through slit 148.

While the best mode for carrying out the invention has been described in detail, those skilled in the art in which this invention relates will recognize various alternative designs and embodiments, including those mentioned above, in practicing the invention that has been defined by the following claims.

We claim:

1. An in-tank diesel fuel recirculating manifold for recirculating warm diesel fuel from an engine through a fuel delivery system to reduce cold temperature clogging of the fuel delivery system, with said manifold comprising:

a housing;

a fuel supply inlet disposed at one end of said housing and adapted to be positioned adjacent a bottom wall of a fuel tank;

a fuel supply outlet disposed at another end of said housing;

a fuel filter disposed within said housing between said fuel supply inlet and said fuel supply outlet;

a fuel return inlet formed on said housing;

a fuel return outlet formed on said housing; and, a temperature sensitive valve assembly disposed downstream of said fuel return inlet and upstream of said fuel return outlet and said fuel supply outlet for directing return fuel to one of said fuel supply outlet and said fuel return outlet, such that, at relatively cold operating temperatures, return fuel combines with supply fuel and is directed through said filter and out through said fuel supply outlet and, at relatively high fuel temperatures, return fuel is directed out through said fuel return outlet.

2. A manifold according to claim 1 wherein said housing defines a longitudinal axis and wherein said filter comprises two longitudinally extending tubular filter elements, with said fuel flowing into the inside of said filter elements, through sidewalls thereof and to said fuel supply outlet.

3. A manifold according to claim 1 further comprising a check valve coupled to said fuel return outlet.

4. A manifold according to claim 3 wherein said check valve comprises an elastomeric flap valve having a pair of legs extending from a tubular portion thereof, with said tubular portion being coupled to said fuel return outlet, with said legs being joined together at peripheral edges thereof to form a slit such that fuel may flow from said tubular portion through said slit and substantially no fuel may flow from said slit to said tubular portion.

5. A manifold according to claim 2 wherein said housing comprises:

a first housing section containing said fuel supply outlet
and comprising:
  two longitudinally extending adjacently siamesed tubular filter housing portions for housing said filter elements disposed at distal end of said first housing section;
  a fuel chamber disposed at a proximal end of said first housing section;
  an upper longitudinally extending tubular valve assembly receiving portion adjacently siamesed to said tubular filter housing portions for receiving a portion of said valve assembly; and,
  a plurality of locking tab receiving holes disposed at said proximal end of said first housing section;
a second housing portion disposed within said fuel chamber, with said second housing portion comprising:
  two filter inlets cooperating with said filter elements for allowing fuel to flow thereto; and,
  a passage substantially axially aligned with said longitudinally extending tubular valve assembly receiving portion for allowing said valve assembly to pass therethrough; and,
a third housing portion containing said fuel supply inlet, said fuel return inlet and said fuel return outlet and comprising:
  a lower longitudinally extending tubular valve assembly receiving portion substantially axially aligned with said upper longitudinally extending tubular valve assembly receiving portion and said passage for receiving a remainder portion of said valve assembly; and,
  a plurality of locking tabs for engaging said plurality of locking tab receiving holes.

6. A manifold according to claim 1 wherein said temperature sensitive valve assembly comprises:
  a temperature sensitive actuator;
  a spool valve cooperating with said actuator and responsive thereto, with said spool valve being in a first position for directing fuel flow to said filter and said fuel supply outlet; and,
  a return spring biasing said spool valve in said first position;
  wherein, at said relatively high operating temperatures, said actuator forces said spool valve into a second position against said return spring such that fuel flow bypasses said filter and is directed to said fuel return outlet.

7. An in-tank diesel fuel recirculating manifold for recirculating warm diesel fuel from an engine through a fuel delivery system to reduce cold temperature clogging of the fuel delivery system, with said manifold defining a longitudinal axis and comprising:
  a first housing section comprising:
    a fuel supply outlet;
    two longitudinally extending adjacently siamesed tubular filter housing portions disposed at a distal end of said first housing section;
    a fuel chamber disposed at a proximal end of said first housing section;
    an upper longitudinally extending tubular valve assembly receiving portion adjacently siamesed to said tubular filter housing portions; and,
    a plurality of locking tab receiving holes disposed at said proximal end of said first housing section; and,
  a second housing portion disposed within said fuel chamber, with said second housing portion comprising:
    two filter inlets axially aligned with said two filter housing portions for allowing fuel to flow thereto; and,
    a passage substantially axially aligned with said longitudinally extending tubular valve assembly receiving portion; and,
  a third housing portion comprising:
    a fuel supply inlet adapted to be positioned adjacent a bottom wall of a fuel tank;
    a fuel return inlet formed on one of said third housing portion;
    a fuel return outlet formed on another side of said third housing portion;
    a check valve coupled to said fuel return outlet; and,
    a lower longitudinally extending tubular valve assembly receiving portion substantially axially aligned with said upper longitudinally extending tubular valve assembly receiving portion and said passage;
    a plurality of locking tabs for engaging said plurality of locking tab receiving holes;
  two longitudinally extending tubular filter elements disposed within said tubular filter housing portions, with said fuel flowing through said filter inlets, into the inside of said filter elements, through sidewalls thereof and to said fuel supply outlet;
  a temperature sensitive valve assembly positioned within said upper valve assembly receiving portion, said lower valve assembly receiving portion and said passage, with said valve assembly being disposed downstream of said fuel return inlet and upstream of said fuel return outlet and said fuel supply outlet for directing return fuel to one of said fuel supply outlet and said fuel return outlet, such that, at relatively cold operating temperatures, return fuel combines with supply fuel and is directed through said filter and out through said fuel supply outlet and, at relatively high fuel temperatures, return fuel is directed out through said fuel return outlet.

8. A manifold according to claim 7 wherein said check valve comprises an elastomeric flap valve having a pair of legs extending from a tubular portion thereof, with said tubular portion being coupled to said fuel return outlet, with said legs being joined together at peripheral edges thereof to form a slit such that fuel may flow from said tubular portion through said slit and substantially no fuel may flow from said slit to said tubular portion.

9. A manifold according to claim 7 wherein said temperature sensitive valve assembly comprises:
  a temperature sensitive actuator;
  a spool valve cooperating with said actuator and responsive thereto, with said spool valve being in a first position for directing fuel flow to said filter and said fuel supply outlet; and,
  a return spring biasing said spool valve in said first position;
  wherein, at said relatively high operating temperatures, said actuator forces said spool valve into a second position against said return spring such that fuel flow bypasses said filter and is directed to said fuel return outlet.

10. A fuel delivery system for a diesel internal combustion engine, with said system comprising:
  a fuel tank;
  a fuel supply line cooperating with at least one fuel pump for supply fuel to the engine;
  a fuel return line for returning excess fuel to the tank;

a diesel fuel recirculating manifold mounted in said tank for recirculating warm diesel fuel from the engine through said manifold to reduce cold temperature clogging of said fuel system, with said manifold comprising:

a housing;

a fuel supply inlet disposed at one end of said housing and positioned adjacent a bottom wall of the fuel tank;

a fuel supply outlet disposed at another end of said housing and coupled to said fuel supply line;

a fuel filter disposed within said housing between said fuel supply inlet and said fuel supply outlet;

a fuel return inlet formed on said housing and coupled to said fuel return line;

a fuel return outlet formed on said housing; and, a temperature sensitive valve assembly disposed downstream of said fuel return inlet and upstream of said fuel return outlet and said fuel supply outlet for directing return fuel to one of said fuel supply outlet and said fuel return outlet, such that, at relatively cold operating temperatures, warm return fuel entering said manifold from said fuel return line combines with supply fuel and is directed through said filter and out through said fuel supply outlet and, at relatively high fuel temperatures, return fuel from said fuel return line is directed out through said fuel return outlet.

11. A system according to claim 10 wherein said housing defines a longitudinal axis and wherein said filter comprises two longitudinally extending tubular filter elements, with said fuel flowing into the inside of said filter elements, through sidewalls thereof and to said fuel supply outlet.

12. A system according to claim 10 further comprising a check valve coupled to said fuel return outlet.

13. A system according to claim 10 wherein said check valve comprises an elastomeric flap valve having a pair of legs extending from a tubular portion thereof, with said tubular portion being coupled to said fuel return outlet, with said legs being joined together at peripheral edges thereof to form a slit such that fuel may flow from said tubular portion through said slit and substantially no fuel may flow from said slit to said tubular portion.

14. A system according to claim 11 wherein said housing comprises:

a first housing section containing said fuel supply outlet and comprising:

two longitudinally extending adjacently siamesed tubular filter housing portions for housing said filter elements disposed at distal end of said first housing section;

a fuel chamber disposed at a proximal end of said first housing section;

an upper longitudinally extending tubular valve assembly receiving portion adjacently siamesed to said tubular filter housing portions for receiving a portion of said valve assembly; and, a plurality of locking tab receiving holes disposed at said proximal end of said first housing section;

a second housing portion disposed within said fuel chamber, with said second housing portion comprising:

two filter inlets cooperating with said filter elements for allowing fuel to flow thereto; and, a passage substantially axially aligned with said longitudinally extending tubular valve assembly receiving portion for allowing said valve assembly to pass therethrough; and, a third housing portion containing said fuel supply inlet, said fuel return inlet and said fuel return outlet and comprising:

a lower longitudinally extending tubular valve assembly receiving portion substantially axially aligned with said upper longitudinally extending tubular valve assembly receiving portion and said passage for receiving a remainder portion of said valve assembly; and, a plurality of locking tabs for engaging said plurality of locking tab receiving holes.

15. A system according to claim 10 wherein said temperature sensitive valve assembly comprises:

a temperature sensitive actuator;

a spool valve cooperating with said actuator and responsive thereto, with said spool valve being in a first position for directing fuel flow to said filter and said fuel supply outlet; and, a return spring biasing said spool valve in said first position;

wherein, at said relatively high operating temperatures, said actuator forces said spool valve into a second position against said return spring such that fuel flow bypasses said filter and is directed to said fuel return outlet.

* * * * *